Jan. 15, 1935.  G. T. JOHNSON  1,988,243
DOUBLE TILTING ARBOR SAW
Filed Aug. 31, 1932   2 Sheets-Sheet 1

Inventor:
Gustave T. Johnson,
By Conrad, Grist + Warden attys.

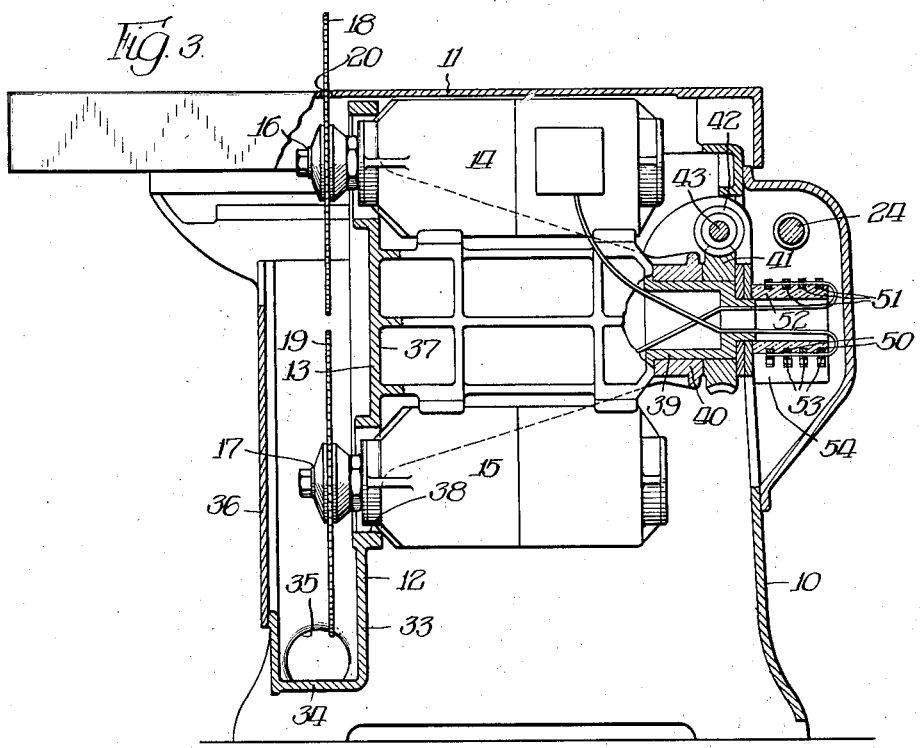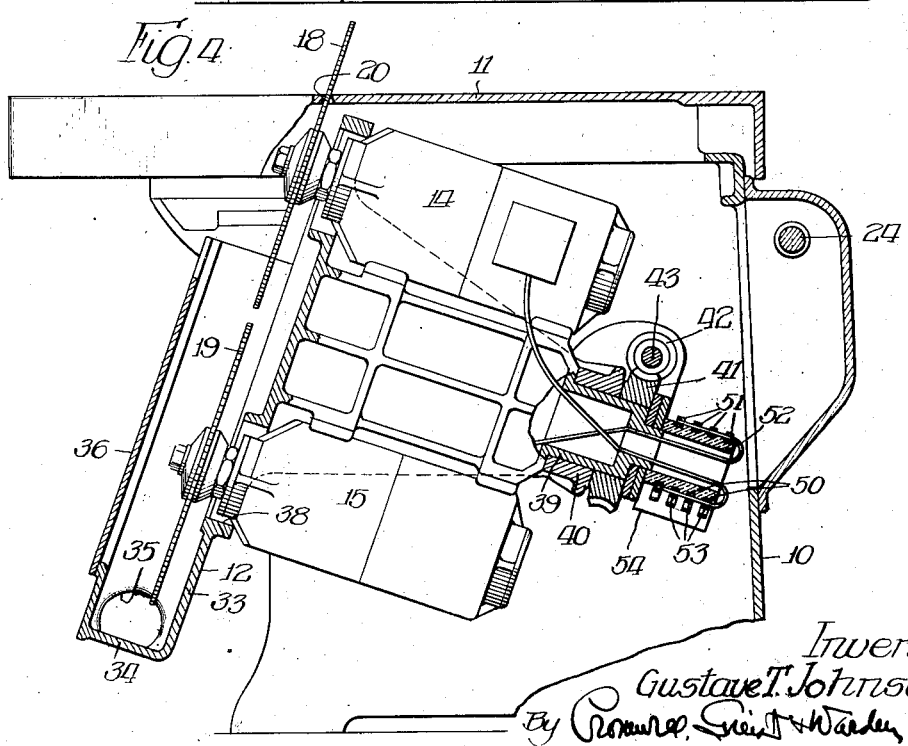

Patented Jan. 15, 1935

1,988,243

UNITED STATES PATENT OFFICE 1,988,243

DOUBLE TILTING ARBOR SAW

Gustave T. Johnson, Beloit, Wis., assignor to Yates-American Machine Company, Beloit, Wis., a corporation of Delaware Application August 31, 1932, Serial No. 631,157

7 Claims. (Cl. 143—45)

The purpose of this invention is to provide a double arbor saw bench of improved construction and operation, in which the work-supporting table remains in a horizontal position at all times, and the saws, which are separately driven by directly connected electric motors, are mounted, motors and all, in a carrier which may be rotated to bring either of the saws up into cutting position and which may also be tilted into different positions to give any desired angle of cut, with the motors so connected as to permit operation of the same only when moved up into cutting position.

While the foregoing statement is indicative in a general way of the nature of the invention, other more specific objects and advantages will be apparent to those skilled in the art upon a full understanding of the construction and operation of the improved machine.

One form of the invention is presented herein for the purpose of exemplification, but it will of course be appreciated that the invention is susceptible of embodiment in other structurally modified forms coming equally within the scope of the appended claims.

In the accompanying drawings:

Fig. 3 is a view which corresponds to Fig. 1, with portions broken away to show the interior; and Fig. 4 is a similar view, showing the secondary frame tilted at an angle to the main frame.

Figure 1:
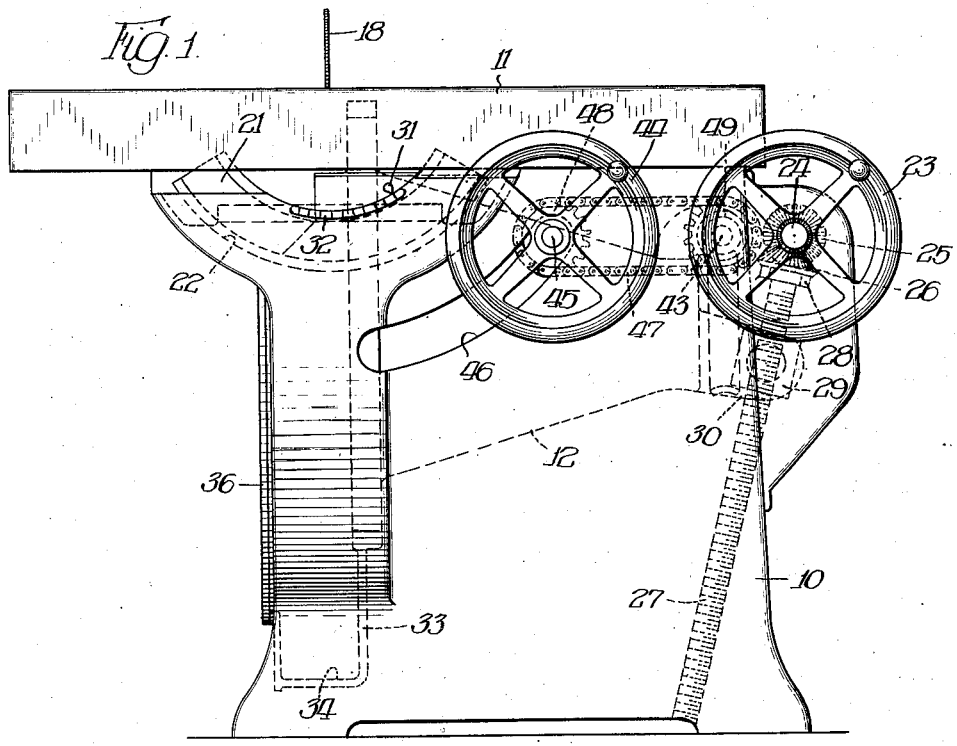
Fig. 1 is a side view of a double arbor saw bench constructed in accordance with the invention.
Figure 2:
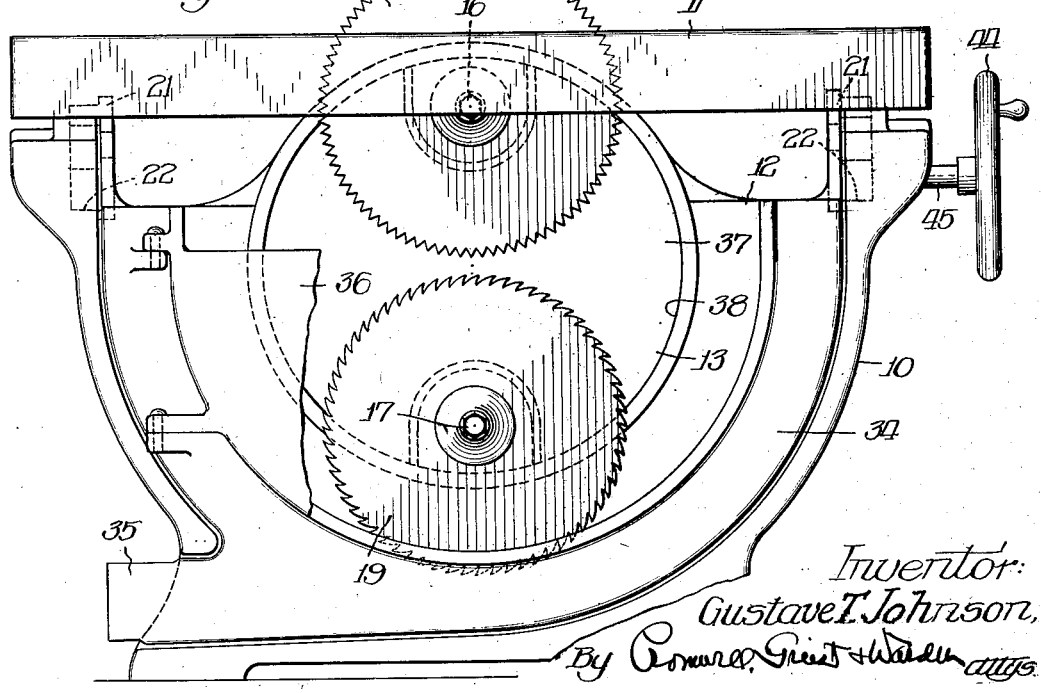
Fig. 2 is a different side view of the same machine.

As will be observed in the drawings, the machine includes a main frame 10 on which a table 11 is rigidly mounted in a horizontal position. A secondary frame 12 is tiltably mounted within the hollow interior of the main frame 10 below the table 11, and a carrier 13 is rotatably mounted in the secondary frame 12. The carrier 13 supports two electric motors 14 and 15, which motors are secured to the carrier at diametrically opposite sides of the latter with their axes parallel to that of the carrier. The armature shafts of the motors constitute arbors 16 and 17 to which cross-cut and rip saws 18 and 19 are secured in any suitable manner. The uppermost saw projects up through a narrow slot 20 in the top of the table 11, and the horizontal line where such saw intersects with the top of the table coincides with the pivotal axis about which the secondary frame 12 tilts.

The mounting for the secondary frame 12 consists of a pair of spaced arcuate members 21 on the sides of such frame which rest in a pair of correspondingly shaped seats 22 in the sides of the main frame 10. The axis of curvature of the members 21 and seats 22 is located on the previously described line of intersection of the uppermost saw with the top of the table, and, when the secondary frame 12 is tilted in the main frame 10 to change the cutting angle, the members 21 will slide in the seats 22, maintaining in all positions thereof a stable suspension for the secondary frame. The arcuate supporting members 21 are so shaped with respect to the seats 22 as to prevent either up and down or sidewise movement of the same.

The tilting movement of the secondary frame 12 is accomplished by means of a hand wheel 23 which is located at one side of the main frame 10. The hand wheel 23 is secured to a shaft 24 which is journaled in the sides of the main frame. The shaft 24 carries a bevel gear 25 which meshes with a similar gear 26 on the upper end of a long downwardly extending screw 27. The screw 27 is journaled adjacent the gear 26 in a small bracket 28 which is free to turn about the shaft 24, and passes through a threaded block 29 which is pivotally mounted in an extension 30 on one end of the secondary frame 12. The block 29 provides a floating support for the lower portion of the screw 27.

When the hand wheel 23 is rotated, the screw 27 will turn and will raise or lower the block 29, depending upon the direction of rotation, thereby sliding the members 21 in the seats 22. The angle of the upper saw with respect to the table is indicated at all times by a pointer 31 on one of the members 21 which overlies a properly calibrated scale 32 on the side of the main frame.

The secondary frame 12 is of skeleton-like construction in order to accommodate the carrier 13, and is provided, at one end thereof, with an outspread end wall 33 which forms a closure for the corresponding end of the main frame. The wall 33 is shaped to form a semi-circular sawdust collector 34 below the saws, which collector exhausts through a tangential bottom outlet 35, and the outside wall of the collector is made as a hinged door 36, through which access may easily be had to the saws.

The carrier 13 is provided, at the saw end thereof, with a circular supporting rim 37 which is journaled peripherally in a large circular bearing aperture 38 in the end wall 33 of the secondary frame 12. At its other end the carrier is provided with a bearing neck 39 which is journaled in a collar 40 on the corresponding end of the secondary frame 12. Beyond the collar 40 the neck 39 of the carrier has secured thereto a worm gear 41 which meshes upwardly with a worm 42. The worm 42 is secured to a shaft 43 which is journaled in bearings on an adjacent portion of the secondary frame 12.

The carrier 13 is rotated to revolve either saw into cutting position by means of a hand wheel 44 which is similar to and is located at one side of the previously described hand wheel 23. The hand wheel 44, instead of being supported in a stationary mounting, is secured to a shaft 45 which extends through an arcuate slot 46 in the side wall of the main frame 10 and is journaled in bearings on the secondary frame 12. The shaft 45 is positioned in spaced parallel relation to the worm shaft 43 and is coupled to the latter by a chain 47 which is trained over sprockets 48 and 49 on the shafts.

The electric motors 14 and 15 are connected respectively to two sets of contact elements 50 and 51, which elements are mounted in diametrically opposite positions on the periphery of an insulated cylinder 52 which is secured to the neck 39 of the carrier beyond the worm gear 41. The contact elements for the motor of whichever saw happens to be in cutting position engage with a set of correspondingly arranged spring contact fingers 53 on a block 54 which is mounted on the secondary frame 12 directly beneath the cylinder 52. The contact fingers 53 are of course connected with the current supply. As soon as either saw is lowered out of cutting position, the contact elements connected with its motor will move out of engagement with the contact fingers. The motor of whichever saw happens to be in cutting position may be started or stopped by means of a suitable switch (not shown).

The double tilting arbor saw bench permits the work to be kept at all times in a horizontal position on the table regardless of the angle at which the work is to be cut. By merely turning the hand wheel 23, the machine can be set for any desired angle, and by merely turning the hand wheel 44, the machine can be changed from a cross cut saw to a rip saw, or vice versa.

I claim:

1. A double tilting arbor saw, comprising a main frame, a flat horizontal work-supporting table thereon, provided with a slot for the reception of a tilted saw, a secondary frame tiltably mounted within the main frame below the table on a center coincident with the top of the table at the location of the slot, a carrier rotatably mounted on the secondary frame, two saws rotatably mounted in the carrier at opposite sides of the latter, means secured to the carrier for rotating the saws, means for rotating the carrier to bring either saw into the slot into cutting position with respect to the top of the table, and means for tilting the secondary frame to give the desired cutting angle to the saw.

2. A double tilting arbor saw, comprising a main frame, a horizontal work-supporting table thereon provided with a slot for the reception of a tilted saw, a secondary frame tiltably mounted within the main frame below the table, a carrier rotatably mounted on the secondary frame, two electric motors secured to the carrier at opposite sides of the latter, saws connected with the motors, a worm gearing for rotating the carrier to bring either saw with its associated motor into cutting position with respect to the slot in the top of the table, and a floating screw for tilting the secondary frame to give the desired cutting angle to the saw.

3. A double tilting arbor saw, comprising a main frame, a horizontal work-supporting table thereon provided with a slot for the reception of a tilted saw, a secondary frame tiltably mounted within the main frame below the table, a carrier rotatably mounted in the secondary frame, two electric motors secured to the carrier at opposite sides of the latter, saws connected with the motors, means for rotating the carrier to bring either saw with its associated motor into cutting position with respect to the slot in the top of the table, and means for tilting the secondary frame to give the desired cutting angle to the saw, said main frame being provided below the table with arcuate seats which are concentric with the pivotal axis of the secondary frame, and said secondary frame being provided with arcuate members for sliding coaction with the seats.

4. A double tilting arbor saw, comprising a main frame, a horizontal work-supporting table thereon provided with a slot for the reception of a tilted saw, a secondary frame tiltably mounted within the main frame below the table, a carrier rotatably mounted on the secondary frame, two electric motors secured to the carrier at opposite sides of the latter, saws connected with the motors, means for rotating the carrier to bring either saw with its associated motor into cutting position with respect to the slot in the top of the table, means for tilting the secondary frame to give the desired cutting angle to the saw, separate electrical contact means for each motor mounted on the carrier for rotation therewith, and other electrical contact means adapted to be connected with a source of current and mounted on the secondary frame in a position to be engaged by either of said separate electrical contact means.

5. A double tilting arbor saw, comprising a main frame, a horizontal work-supporting table thereon provided with a slot for the reception of a tilted saw, a secondary frame tiltably mounted within the main frame below the table, a carrier rotatably mounted on the secondary frame, two electric motors secured to the carrier at opposite sides of the latter, saws connected with the motors, a hand wheel journaled on the secondary frame and connected with the carrier for rotating the latter to bring either saw with its associated motor into cutting position with respect to the slot in the top of the table, and a second hand wheel journaled on the main frame adjacent the first mentioned hand wheel and connected with the secondary frame for tilting the latter to give the desired cutting angle to the saw.

6. A double tilting arbor saw, comprising a main frame, a horizontal work-supporting table thereon provided with a slot for the reception of a tilted saw, a secondary frame tiltably mounted within the main frame below the table, a carrier rotatably mounted on the secondary frame, two or more saws rotatably mounted in the carrier in spaced relation to each other, a plurality of saw-driving means also mounted in the carrier, means for rotating the carrier to bring any one particular saw into cutting position with respect to the slot in the top of the table, and means for tilting the secondary frame to give the desired cutting angle to the saw.

7. A double tilting arbor saw, comprising a main frame, a flat horizontal work-supporting table thereon provided with a slot for the reception of a tilted saw, a secondary frame tiltably mounted within the main frame below the table on a center coincident with the top of the table at the location of the slot, a carrier rotatably mounted on the secondary frame, two saws rotatably mounted in the carrier at opposite sides of the latter, means secured to the carrier for rotating the saws, means for rotating the carrier to bring either saw into the slot into cutting position with respect to the top of the table, and means for tilting the secondary frame to give the desired cutting angle to the saw, said main frame being provided at opposite sides thereof with upwardly curved arcuate seats, which seats are concentric with the line of intersection between the slot and the top of the table, and said secondary frame being provided at opposite sides thereof with correspondingly curved members which shiftably fit within the seats, whereby to provide a stable support for the secondary frame regardless of the position into which the latter is tilted.

GUSTAVE T. JOHNSON.